US010394531B2

(12) United States Patent
Hulick

(10) Patent No.: US 10,394,531 B2
(45) Date of Patent: Aug. 27, 2019

(54) HYPER DYNAMIC JAVA MANAGEMENT EXTENSION

(71) Applicant: AppDynamics LLC, San Francisco, CA (US)

(72) Inventor: Walter Ted Hulick, Pearland, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/582,660

(22) Filed: Apr. 29, 2017

(65) Prior Publication Data

US 2018/0314498 A1 Nov. 1, 2018

(51) Int. Cl.

| | |
|---|---|
| ***G06F 8/30*** | (2018.01) |
| ***G06F 9/54*** | (2006.01) |
| ***G06F 11/34*** | (2006.01) |
| ***G06F 8/656*** | (2018.01) |
| ***G06F 9/445*** | (2018.01) |
| ***G06F 9/455*** | (2018.01) |

(52) U.S. Cl.

CPC ................ *G06F 8/315* (2013.01); *G06F 8/31* (2013.01); *G06F 9/44521* (2013.01); *G06F 9/45504* (2013.01); *G06F 9/542* (2013.01); *G06F 11/34* (2013.01); *G06F 11/3409* (2013.01); *G06F 8/656* (2018.02)

(58) Field of Classification Search

CPC ... G06F 8/31; G06F 8/315; G06F 8/65; G06F 8/656; G06F 9/44521; G06F 9/45504; G06F 11/30; G06F 11/3409

USPC ................. 717/118, 127, 148, 162, 168–173

See application file for complete search history.

(56) References Cited

U.S. PATENT DOCUMENTS

| | | | | |
|---|---|---|---|---|
| 7,412,497 B2 | 8/2008 | Viswanath et al. | | |
| 7,784,047 B2 * | 8/2010 | Simpson | H04L 41/00 | 717/120 |
| 8,165,978 B1 * | 4/2012 | Batra | G06N 5/043 | 706/45 |

(Continued)

FOREIGN PATENT DOCUMENTS

WO 00/77631 A1 12/2000

OTHER PUBLICATIONS

Nicholas, How to dynamically add and register new attributes to mbean, stackoverflow, Feb. 12, 2013, 3 pages, [retrieved on Jul. 25, 2018], Retrieved from the Internet: <URL:https://stackoverflow.com/questions/14832576/how-to-dynamically-add-and-register-new-attributes-to-mbean>.*

(Continued)

*Primary Examiner* — Geoffrey R St Leger

(74) *Attorney, Agent, or Firm* — Behmke Innovation Group LLC; James Behmke; Stephen D. LeBarron

(57) ABSTRACT

In one aspect, a system for exposing application metrics on the fly is disclosed. The system includes a processor; a memory; and one or more modules stored in the memory and executable by a processor to perform various operations. The operations include initialize a Java managed object for Java Management Extension (JMX); attach the initialized Java managed object to a repository for Java managed objects accessible by applications; create a fixed reference to an attributes field in the attached Java managed object; provide the created fixed reference to the repository after initialization of the Java managed object; save the fixed reference; describe an attribute to be created; and create a new attribute in the Java managed object.

20 Claims, 6 Drawing Sheets

(56) References Cited

U.S. PATENT DOCUMENTS

| | | | | |
|---|---|---|---|---|
| 8,561,034 | B2 * | 10/2013 | Belapurkar | G06F 11/3668 717/118 |
| 8,621,429 | B2 * | 12/2013 | Okada | G06F 8/24 717/108 |
| 8,856,747 | B2 * | 10/2014 | Gerginov | G06F 8/20 717/125 |
| 2003/0120824 | A1 * | 6/2003 | Shattuck | G06F 9/4492 719/313 |
| 2003/0177477 | A1 * | 9/2003 | Fuchs | G06F 9/44505 717/136 |
| 2004/0003122 | A1 * | 1/2004 | Melillo | G06F 9/465 709/246 |
| 2004/0230973 | A1 * | 11/2004 | Cundiff, Jr. | G06F 9/5027 718/1 |
| 2004/0254944 | A1 * | 12/2004 | Simpson | H04L 41/00 |
| 2005/0131994 | A1 | 6/2005 | Chang et al. | |
| 2009/0182849 | A1 | 7/2009 | Inamdar et al. | |
| 2009/0182880 | A1 * | 7/2009 | Inamdar | H04L 41/0213 709/226 |
| 2011/0145794 | A1 * | 6/2011 | Gerginov | G06F 8/20 717/125 |

OTHER PUBLICATIONS

MbeansDescriptorDynamicMBeanSoiurce, www.javadocexamples.com, 2011, 3 pages, Retrieved from the Internet: <URL:http://www.javadocexamples.com/java_source/org/apache/commons/modeler/modules/MbeansDescriptorsDynamicMBeanSource.java.html>.*

Kreger, H., Java Management Extensions for application management, IBM Systems Journal, vol. 40, Issue: 1, 2001, pp. 104-129, [retrieved on Apr. 5, 2019], Retrieved from the Internet: <URL:http://ieeexplore.ieee.org/>.*

Lu, F., et al., A JMX Toolkit for Merging Network Management Systems, Proceedings of the 29th Australasian Computer Science Conference—vol. 48, 2006, pp. 147-156, [retrieved on Apr. 5, 2019], Retrieved from the Internet: <URL:http://dl.acm.org/>.*

International Search Report and Written Opinion dated Jul. 31, 2018 in connection with PCT/US2018/029806.

* cited by examiner

HYPER DYNAMIC JAVA MANAGEMENT EXTENSION

BACKGROUND

Java Management Extension (JMX) has existed since the release of Java 5 for the purpose of publishing metrics that can be consumed via JMX queries either on a local level or accessed remotely. JMX publishes these metrics via attributes that are exposed through a Management Bean called MBeans. The MBeans can vary as to the type but are attached to an MBean Server, such as the Platform MBean Server. Once attached, they are exposed to any JMX client that can either be in the Java Virtual Machine (JVM) or external and accessed via several remote protocol options.

SUMMARY

Examples of implementations for a new framework called Hyper Dynamic JMX are disclosed. Specifically, the disclosed technology for a new framework called Hyper Dynamic JMX is used to obtain various advantages including dynamic (i.e., no restart needed) on demand exposure of metrics that does not require code changes or coding in the application leading to low TCO for customers. The disclosed technology for the new Hyper Dynamic JMX framework can be used to dynamically map at runtime, new business metrics or analytics on demand that can literally access any class and any method without a restart, recoding, etc. In addition, the disclosed technology can be used for troubleshooting.

In one aspect, a system for exposing application metrics on the fly is disclosed. The system includes a processor; a memory; and one or more modules stored in the memory and executable by a processor to perform various operations. The operations include initialize a Java managed object for Java Management Extension (JMX); attach the initialized Java managed object to a repository for Java managed objects accessible by applications; create a fixed reference to an attributes field in the attached Java managed object; provide the created fixed reference to the repository after initialization of the Java managed object; save the fixed reference; describe an attribute to be created; and create a new attribute in the Java managed object. Creating the new attribute includes create an object representing the new attribute, place the object representing the new attribute into an attribute map, reference the attribute map using a name associated with the new attribute, inject information from the attribute map into an array of attribute information objects compatible with JMX, and update the attribute field of the Java managed object to point to the array of attribute information objects compatible with JMX.

The system can be implemented in various ways to include one or more of the following features. For example, the Java managed object can include a JMX Managed Bean (MBean). The one or more modules can be configured to access the new attribute(s) using a reflection chain expression. The one or more modules can be configured to modify the new attribute(s). The one or more modules can be configured to modify the new attribute including: update the attribute map; convert the updated attribute(s) map into another array of attribute information objects compatible with JMX and update the attributes field in the Java managed object to point to the other another array of attribute information objects compatible with JMX. The one or more modules can be configured to create the new attribute(s) on the fly without restarting a Java Virtual Machine (JVM). The one or more modules can be configured to modify the new attribute(s) on the fly without restarting a Java Virtual Machine (JVM). The one or more modules can be configured to create and modify the new attribute(s) on the fly using a reflection chain.

In another aspect, the disclosed technology can be implemented in a method for exposing application metrics on the fly. The method includes initializing a Java managed object for Java Management Extension (JMX); attaching the initialized Java managed object to a repository for Java managed objects accessible by applications; creating a fixed reference to an attributes field in the attached Java managed object; providing the created fixed reference to the repository after initialization of the Java managed object; saving the fixed reference; describing an attribute to be created; and creating a new attribute in the Java managed object. Creating the new attribute includes creating an object representing the new attribute, placing the object representing the new attribute into an attribute map, referencing the attribute map using a name associated with the new attribute, injecting information from the attribute map into an array of attribute information objects compatible with JMX, and updating the attribute field of the Java managed object to point to the array of attribute information objects compatible with JMX.

The method can be implemented to include one or more of the following features. For example, the Java managed object can include a JMX Managed Bean (MBean). Accessing the new attribute includes using a reflection chain expression. The method can include modifying the new attribute. Modifying the new attribute can include updating the attribute map; converting the updated attribute map into another array of attribute information objects compatible with JMX and updating the attributes field in the Java managed object to point to the other another array of attribute information objects compatible with JMX. Creating the new attribute on the fly can be performed without restarting a Java Virtual Machine (JVM). Modifying the new attribute on the fly can be performed without restarting a Java Virtual Machine (JVM). Creating and modifying the new attribute on the fly can be performed using a reflection chain.

In yet another aspect, the disclosed technology can be implemented in a non-transitory computer readable medium embodying instructions when executed by a processor to cause operations to be performed for exposing application metrics on the fly. The operations include initializing a Java managed object for Java Management Extension (JMX); attaching the initialized Java managed object to a repository for Java managed objects accessible by applications; creating a fixed reference to an attributes field in the attached Java managed object; providing the created fixed reference to the repository after initialization of the Java managed object; saving the fixed reference; describing an attribute to be created; and creating a new attribute in the Java managed object including: creating an object representing the new attribute, placing the object representing the new attribute into an attribute map, referencing the attribute map using a name associated with the new attribute, injecting information from the attribute map into an array of attribute information objects compatible with JMX, and updating the attribute field of the Java managed object to point to the array of attribute information objects compatible with JMX.

The non-transitory computer readable medium can be implemented to include one or more of the following features. For example, the Java managed object can include a JMX Managed Bean (MBean). The instructions can be executable to access the new attribute using a reflection chain expression. The instructions can be accessible to modify the new attribute.

DETAILED DESCRIPTION

Figure 1A:
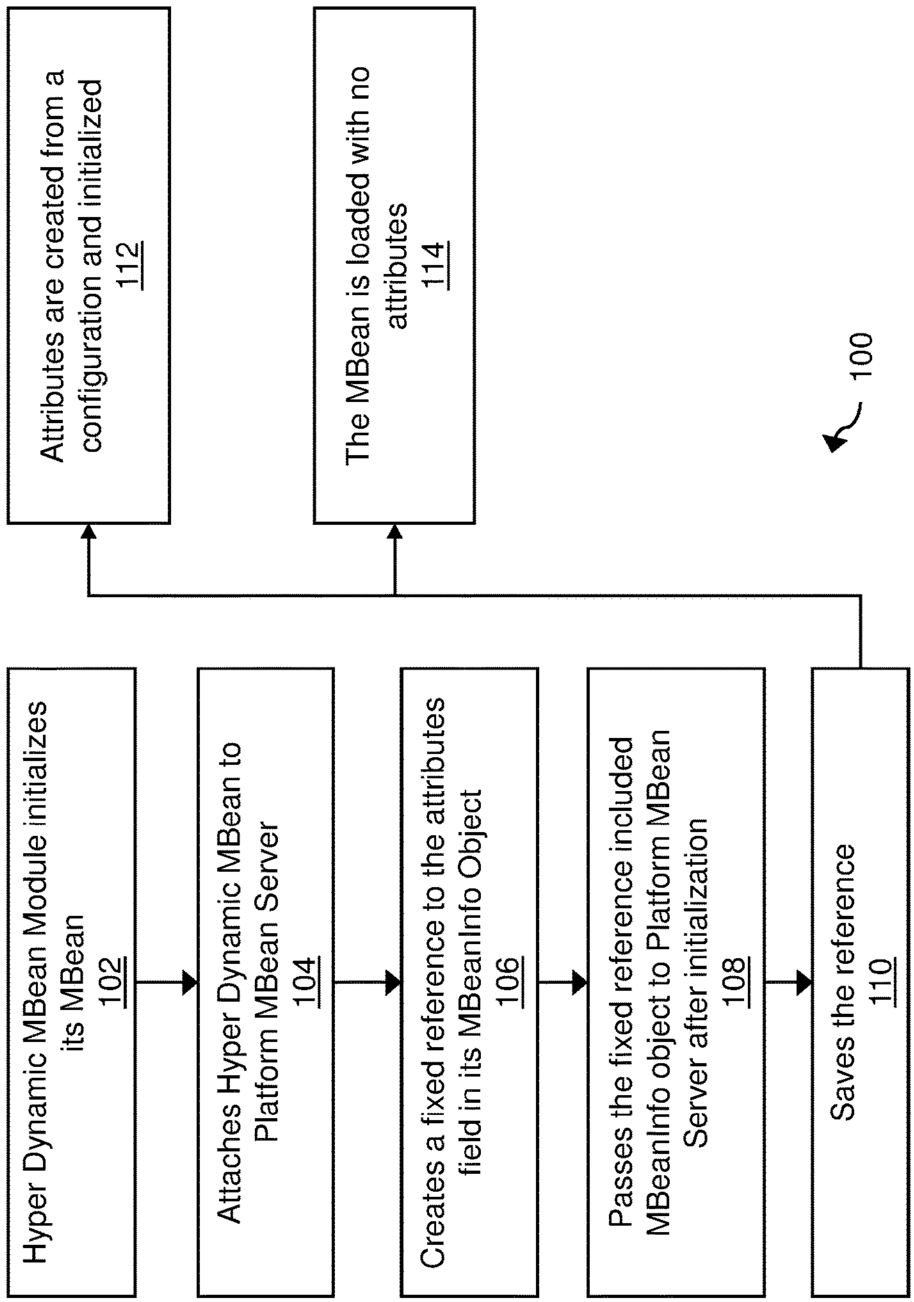
FIGS. 1A, 1B, 1C, 1D, and 1E are process flow diagrams of exemplar processes for implementing Hyper Dynamic JMX.

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

Hyper Dynamic JMX Overview

JMX is a platform for exposing Java metrics and operations inside a running Java Virtual Machine (JVM) to be used by a local or remote client. JMX has interfaces that expose metrics under a namespace of domain, object, and attributes in MBeans exposed by the MBean Platform server. MBeans is a managed Java object, similar to JavaBeans component, that follows the design pattern set forth in the JMX specification. An MBean can represent a device, an application, or any resource that needs to be managed. MXBeans is a type of MBean that references only a predefined set of data types. A JMX connector makes an MBean server accessible to remote Java technology-based clients.

An operation allows for execution of a method exposed by an MBean. An attribute defines a metric and metric data type exposed by the MBean. An ObjectName is an MBean name for example domain:key=property. A Domain is a prefix to the ObjectName, usually specifies "com.company. type . . . " JConsole is a widely distributed (with Java) JMX console (client) to browse JMX metrics and execute operations. A reflection is a technique that uses Application Program Interfaces (APIs) to examine, introspect and in some cases alter the behavior of a program at runtime, such as a running JVM. A reflection chain expression is a string that represents a recursive execution of methods and/or fields that yield instance values with the intent to create a single metric. Normally the chain would start with either a known instance or a static method/field that provided a starting instance.

Originally, JMX MBeans were very static and required interfaces or implementations to expose metrics. JMX MBeans have evolved to become a dynamic type framework to help expose metrics via either configuration files or even annotations. However, even the dynamic JMX MBeans are limited. For example, metrics or attributes have to be predetermined at runtime in some data structure generally as an accessible field. Once an MBean is instantiated, all attributes are fixed with no additions or removals possible. Moreover, on the fly targeting of data/metrics that may be "virtual" in nature is not possible.

JMX supports different MBean types. Standard MBeans use a simple JavaBean style naming convention and a statically defined management interface. This is the most common type of MBean used by JBoss. Dynamic MBeans implement the javax.management.DynamicMBean interface, and expose their management interface at runtime when the component is instantiated for the greatest flexibility. JBoss makes use of Dynamic MBeans in circumstances where the components to be managed are not known until runtime. Open MBeans are an extension of dynamic MBeans. Open MBeans rely on basic, self-describing, user-friendly data types for universal manageability. Model MBeans are also an extension of dynamic MBeans. Model MBeans implement the javax.management.modelmbean. ModelMBean interface. Model MBeans simplify the instrumentation of resources by providing default behavior.

The technology disclosed in this patent document provides for dynamic and efficient application intelligence platforms, systems, devices, methods, and computer readable media including non-transitory type that embody instructions for causing a machine including a processor to perform various operations disclosed in this patent document to implement Hyper Dynamic JMX. Hyper Dynamic JMX combines a dynamic MBean proxy with reflection chaining techniques (sometimes known as getter or setter chains) to create a highly dynamic infrastructure for exposing JMX attributes (metrics).

JMX dynamic MBeans are used by both Model MBeans and Open MBeans and represent the ability to expose attributes and operations at runtime, even in classes that may not even know they are being exposed by JMX. Hyper Dynamic MBeans use the dynamic MBean interface but enhances the dynamic aspect by providing features nonexistent in dynamic MBeans. In one aspect, Hyper Dynamic MBeans provide dynamic ability to expose and create any filed or metric inside the JVM runtime on the fly. For example, Hyper Dynamic MBeans provides the ability to create and remove attributes and operations after MBean registration or instantiation. All dynamic MBeans including regular MBeans, model MBeans, and open MBeans are designed to expose their attributes and operations only during registration or instantiation and once exposed become immutable. In addition, Hyper Dynamic MBeans provide the ability to dynamically access both fields and methods using reflection chains (methods/fields) on the fly even if fields and methods are not accessible outside the class. Dynamic MBeans implementations target public (accessible) get/set methods only and expose these methods via a hard coded process.

Hyper Dynamic JMX Techniques and Advantages

Hyper Dynamic JMX uses single MBean capable of supporting dynamic attributes including additions and subtractions. Hyper Dynamic JMX uses dynamic mapping of attributes to a virtual implementation that can be a fixed field or metric without any coding required. Hyper Dynamic JMX can be implemented to parse and execute a reflection chain expression either in a two step process or on the fly. The reflection chain work off root singleton patterns such as a static reference to a singleton instance that could be anywhere in the application as well as any other root static reference. These techniques allow Hyper Dynamic JMX to provide various advantages. For example, Hyper Dynamic JMX can expose and consume customer application metrics without coding and on the fly. Hyper Dynamic JMX can expose and consume JVM troubleshooting metrics without coding and on the fly without needing to restart the JVM.

Hyper Dynamic MBean Module

The disclosed technology for Hyper Dynamic JMX can be implemented using a Hyper Dynamic MBean Module. FIG. 1A is a process flow diagram illustrating an exemplary process 100 for implementing Hyper Dynamic JMX using the Hyper Dynamic MBean Module. The Hyper Dynamic MBean Module can be loaded and started anytime after the MBean Platform Server startup using the Java Agent switch mechanism. Once loaded, the Hyper Dynamic MBean Module initializes its MBean (102) and attaches the Hyper Dynamic MBean to the Platform MBean Server (104). Platform MBean is an MBean for monitoring the JVM encapsulating a part of JVM functionality. The Platform MBean Server is a repository of MBeans that provides management applications access to MBeans. Applications access MBeans through the Platform MBean Server using unique ObjectName rather than accessing the MBeans directly. The Hyper Dynamic MBean Module creates a fixed reference to the attributes field in its MBean MBeanInfo object (106) and passes the fixed reference to the Platform MBean Server after initialization (108). The reference is saved (110). The attributes field controls which attributes are fixed. The attributes field assumes that the attributes for the MBean are immutable. At this point, either the attributes are created from a configuration and initialized (112) or the MBean is simply loaded with no attributes (114).

Figure 1B:
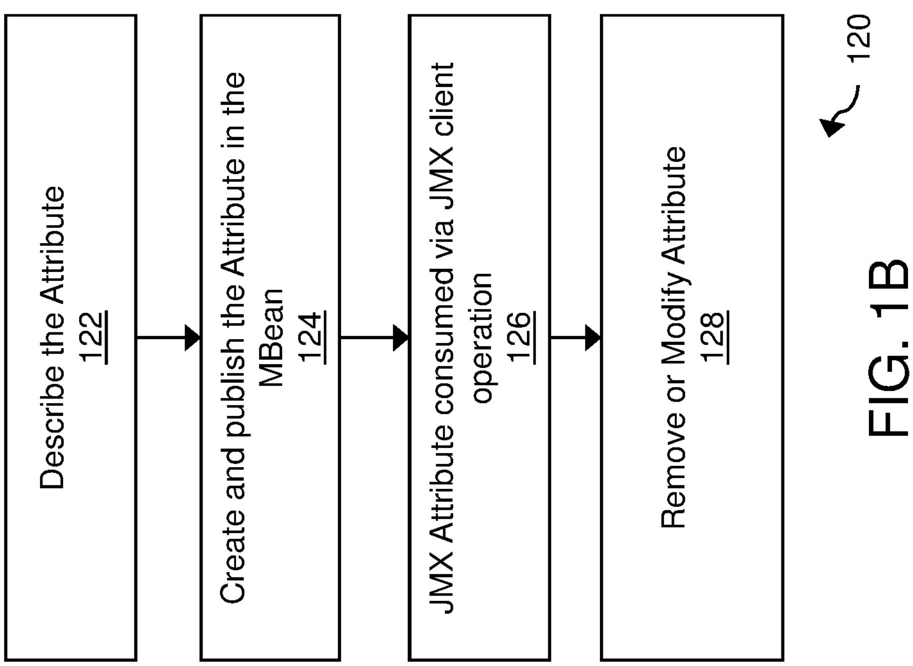

FIG. 1B is a process flow diagram of an exemplary process 120 for creating, using and modifying an attribute using Hyper Dynamic JMX techniques as disclosed in this document. An attribute to be created is described (122). For example, the name, type (java.lang.etc), description, and virtual location, which will be a reflection chain expression can be described for the attribute to be created. The attribute is created and published in the MBean (124). A JMX client can consume the created JMX Attribute (126). The created Attribute can be modified or removed (128).

Figure 1C:
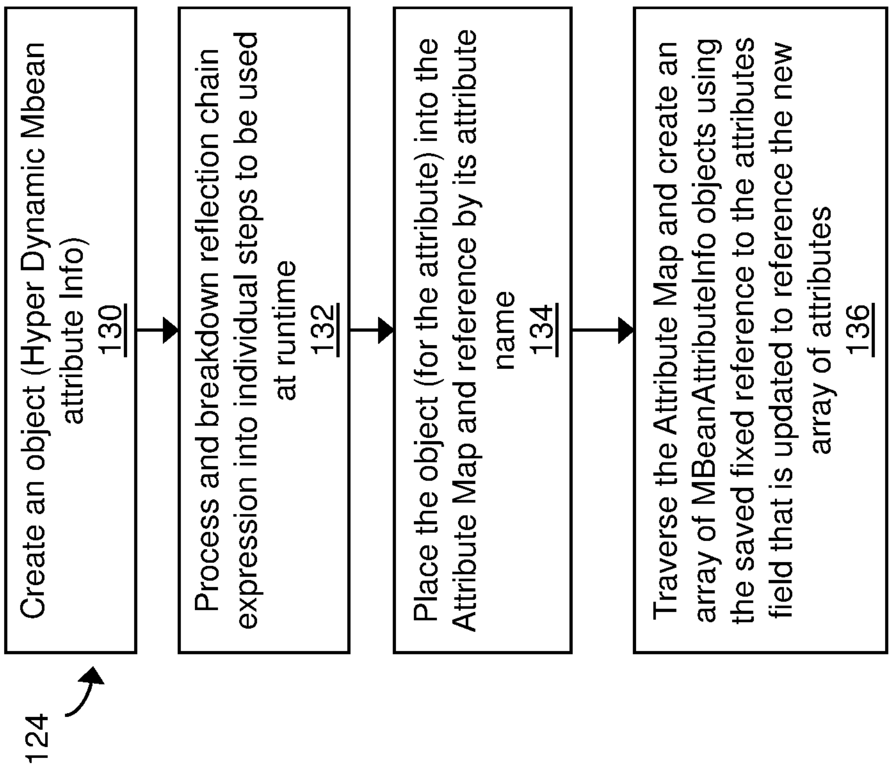

FIG. 1C is a process flow diagram of an exemplary process 124 for creating and publishing the attribute in the MBean. The exemplary process 124 for creating and publishing the attribute in the MBean includes creating an object (Hyper Dynamic MBean attribute info) similar to MBeanAttributeInfo used by JMX (130). Creating and publishing the attribute in the MBean includes processing and breaking down the reflection chain expression into individual steps to be used at runtime (132). An example is: hd_hmxHD_JMX.serverFieldForTest.getClass( ).getClassLoader( ).getURSs( ).$length( ).

Creating and publishing the attribute in the MBean includes placing the object (for the attribute) into an Attribute Map and referencing by its attribute name (134). The Attribute Map represents the Hyper Dynamic MBeans internal attributes. The Attribute Map is traversed and injected into what JMX expects, an array of MBeanAttributeInfo objects that are created using the saved fixed reference to the attributes field that is updated to reference the new array of attributes from the Hyper Dynamic MBean attribute info (136).

Figure 1D:
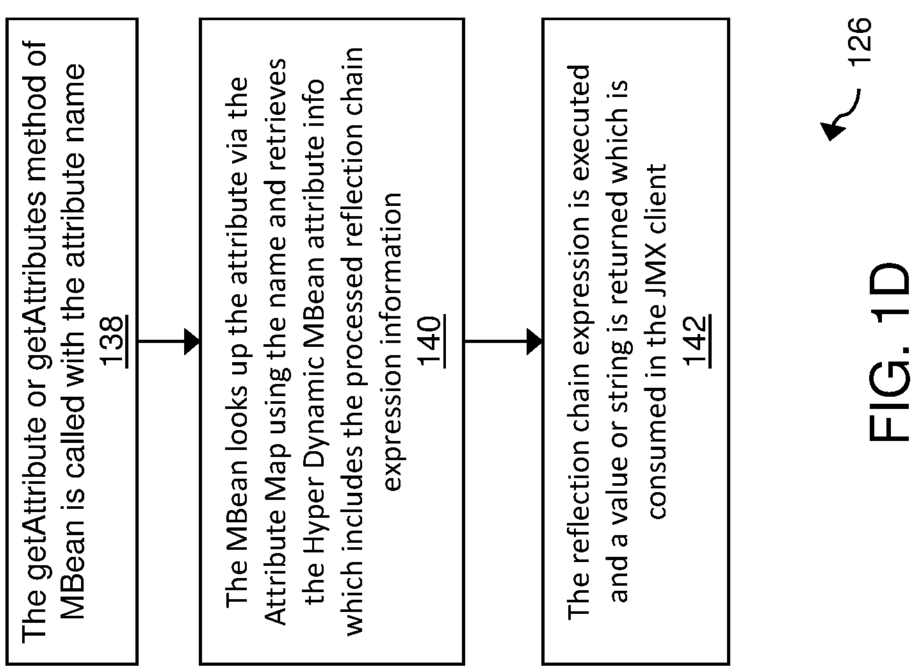

JMX attributes are consumed via JMX client operation, such as JConsole. FIG. 1D is a process flow diagram of an exemplary process 126 for consuming JMX attributes. The getAttribute or getAttributes method of the MBean is called with the attribute name (138). The MBean looks up the attribute via the Attribute Map using the name and retrieves the Hyper Dynamic MBean attribute info which includes the processed reflection chain expression information (140). The reflection chain expression is executed and a value or string is returned which is consumed in the JMX client (142).

Figure 1E:
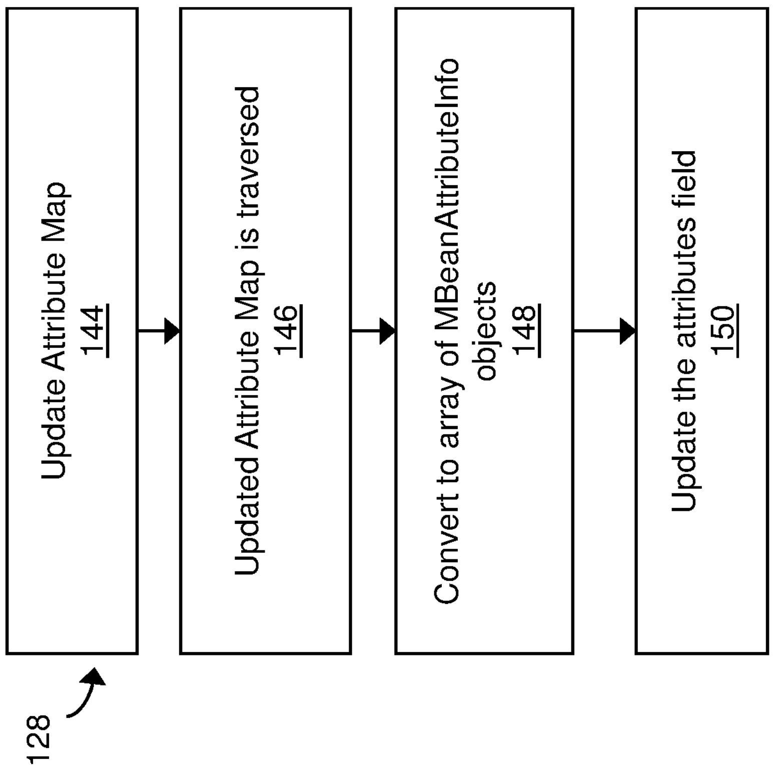

FIG. 1E is a process flow diagram of an exemplary process 128 for removing or modifying attributes. The Attribute Map is updated to remove or modify the target attributes (144). The updated Attribute Map is traversed (146), converted to an array of MBeanAttributeInfo objects (148), and the attributes field is updated to reference the new array of attributes (150).

Exemplary Application of Hyper Dynamic JMX

A customer can choose the metric browser option and then initiates Create New JMX Metric. In response to initiating the Create New JMX Metric, a form can be presented to the customer. The customer can select or key in JMX required information to define the metrics with the attribute names into the form. The form can also include the ability to describe a reflection chain (e.g., using a wizard helper) to target the real metric to be mapped. Once the form is completed (e.g., indicated by the press of a button on a display), the MBean interface class is created. Then the MBean impl (implementation) class is created. MBean Implementation attribute getter/setters would then call a universal map which would map the class or attribute to a getter/setter reflection chain which would do the actual reflection work and handle statics, etc. This would be registered with the MBean Platform Server. At runtime, the Implementation attribute get/set methods would proxy to the getter/setter chains to provide the value as a metric.

Application Intelligence Platform Architecture

The disclosed technology for hyper dynamic JMX can be applied to enhance the performance of an application intelligence platform for application performance management. Many of the advantages of the disclosed technology including the ability to expose metrics on the fly without coding or restarting the JVM can improve the performance of the application intelligence platform for application performance management. In one aspect, as discussed with respect to FIGS. 2-4 below, performance issues with a monitored environment is detected by monitoring applications and entities, such as transactions, tiers, nodes, and machines in the monitored environment using agents installed at individual machines at the entities. For example, each node can include one or more machines that perform part of the applications. The agents collect data associated with the applications of interest and associated nodes and machines where the applications are being operated. Examples of the collected data include performance data, such as metrics, metadata, and topology data that indicate relationship information. The agent collected data are provided to one or more controllers to analyze the data.

Figure 2:
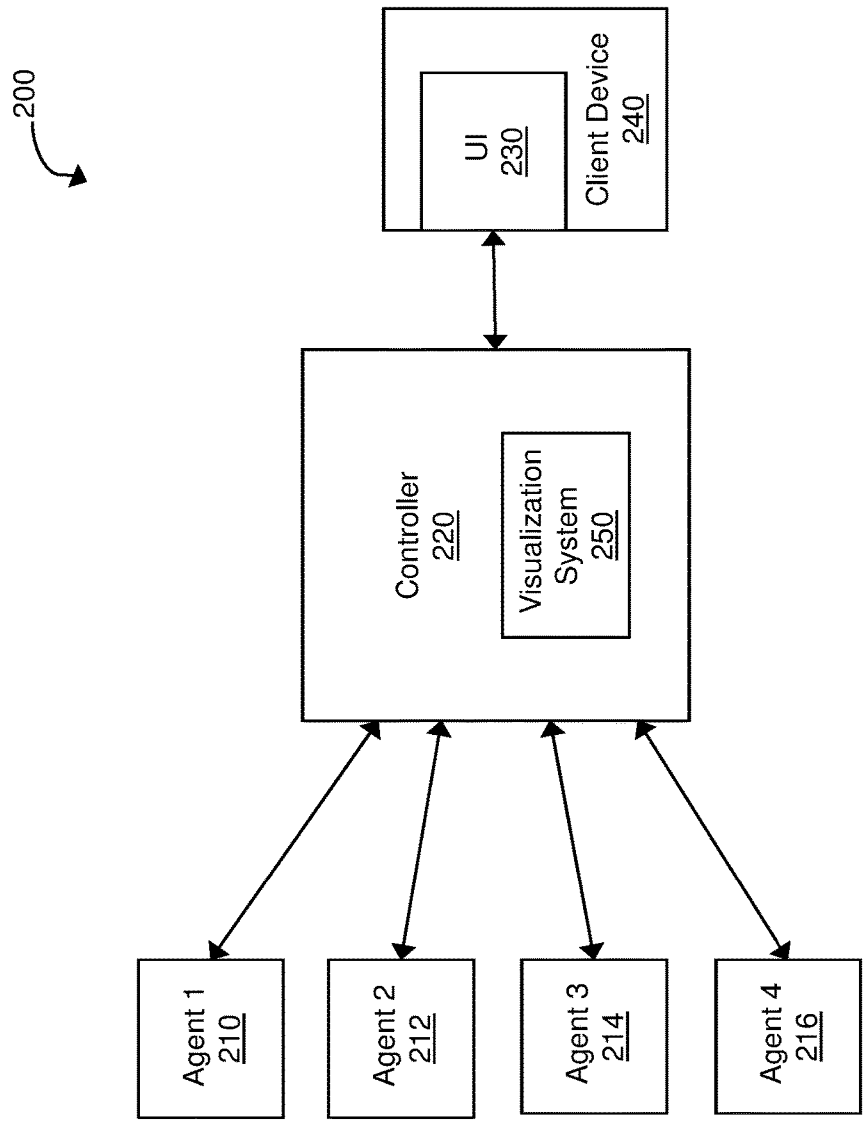
FIG. 2 is a block diagram of an exemplary application intelligence platform that can implement the Hyper Dynamic JMX as disclosed in this patent document, including the processes disclosed with respect to FIGS. 1A-1E.

FIG. 2 is a block diagram of an exemplary application intelligence platform 200 that can implement the hyper dynamic JMX as disclosed in this patent document. The application intelligence platform is a system that monitors and collect metrics of performance data for an application environment being monitored. At the simplest structure, the application intelligence platform includes one or more agents 210, 212, 214, 216 and one or more controllers 220. While FIG. 2 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 220 is the central processing and administration server for the application intelligence platform. The controller 220 serves a browser-based user interface (UI) 230 that is the primary interface for monitoring, analyzing, and troubleshooting the monitored environment. The controller 220 can control and manage monitoring of business transactions distributed over application servers. Specifically, the controller 220 can receive runtime data from agents 210, 212, 214, 216 and coordinators, associate portions of business transaction data, communicate with agents to configure collection of runtime data, and provide performance data and reporting through the interface 230. The interface 230 may be viewed as a web-based interface viewable by a client device 240. In some implementations, a client device 240 can directly communicate with controller 220 to view an interface for monitoring data.

In the Software as a Service (SaaS) implementation, a controller instance 220 is hosted remotely by a provider of the application intelligence platform 200. In the on-premise (On-Prem) implementation, a controller instance 220 is installed locally and self-administered.

The controllers 220 receive data from different agents 210, 212, 214, 216 deployed to monitor applications, databases and database servers, servers, and end user clients for the monitored environment. Any of the agents 210, 212, 214, 216 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs. Browser agents (e.g., agents 210, 212, 214, 216) can include Reporters that report monitored data to the controller.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 220 can include a visualization system 250 for displaying the reports and dashboards related to the disclosed technology. In some implementations, the visualization system 250 can be implemented in a separate machine (e.g., a server) different from the one hosting the controller 220.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture of a given application at a certain point in time. Snapshots usually include call graphs that allow that enables drilling down to the line of code that may be causing performance problems. The most common snapshots are transaction snapshots.

Exemplary Implementation of Application Intelligence Platform

Figure 3:
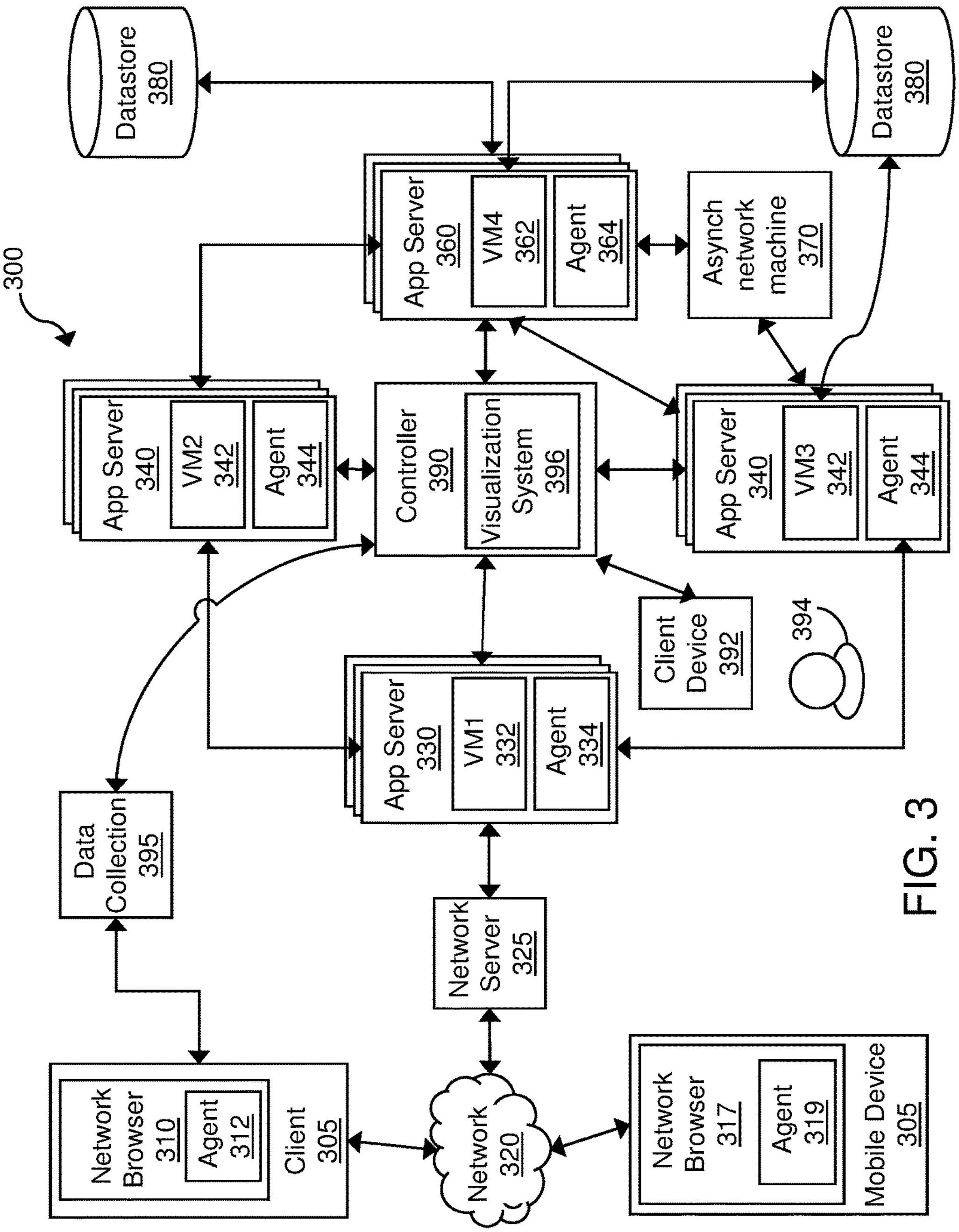
FIG. 3 is a block diagram of an exemplary system for implementing Hyper Dynamic JMX as disclosed in this patent document, including the processes disclosed with respect to FIGS. 1A-1E.

FIG. 3 is a block diagram of an exemplary system 300 for performing hyper dynamic JMX as disclosed in this patent document, including the processes disclosed with respect to FIGS. 1A, 1B, 1C, 1D, and 1E. The system 300 in FIG. 3 includes client device 305 and 392, mobile device 315, network 320, network server 325, application servers 330, 340, 350 and 360, asynchronous network machine 370, data stores 380 and 385, controller 390, and data collection server 395. The controller 390 can include visualization system 396 for providing displaying of the report generated for the hyper dynamic JMX as disclosed in this patent document. In some implementations, the visualization system 396 can be implemented in a separate machine (e.g., a server) different from the one hosting the controller 390.

Client device 305 may include network browser 310 and be implemented as a computing device, such as for example a laptop, desktop, workstation, or some other computing device. Network browser 310 may be a client application for viewing content provided by an application server, such as application server 330 via network server 325 over network 320.

Network browser 310 may include agent 312. Agent 312 may be installed on network browser 310 and/or client 305 as a network browser add-on, downloading the application to the server, or in some other manner. Agent 312 may be executed to monitor network browser 310, the operating system of client 305, and any other application, API, or another component of client 305. Agent 312 may determine network browser navigation timing metrics, access browser cookies, monitor code, and transmit data to data collection 360, controller 390, or another device. Agent 312 may perform other operations related to monitoring a request or a network at client 305 as discussed herein including report generating.

Mobile device 315 is connected to network 320 and may be implemented as a portable device suitable for sending and receiving content over a network, such as for example a mobile phone, smart phone, tablet computer, or other portable device. Both client device 305 and mobile device 315 may include hardware and/or software configured to access a web service provided by network server 325.

Mobile device 315 may include network browser 317 and an agent 319. Mobile device may also include client applications and other code that may be monitored by agent 319. Agent 319 may reside in and/or communicate with network browser 317, as well as communicate with other applications, an operating system, APIs and other hardware and software on mobile device 315. Agent 319 may have similar functionality as that described herein for agent 312 on client 305, and may repot data to data collection server 360 and/or controller 390.

Network 320 may facilitate communication of data among different servers, devices and machines of system 300 (some connections shown with lines to network 320, some not shown). The network may be implemented as a private network, public network, intranet, the Internet, a cellular network, Wi-Fi network, VoIP network, or a combination of one or more of these networks. The network 320 may include one or more machines such as load balance machines and other machines.

Network server 325 is connected to network 320 and may receive and process requests received over network 320. Network server 325 may be implemented as one or more servers implementing a network service, and may be implemented on the same machine as application server 330 or one or more separate machines. When network 320 is the Internet, network server 325 may be implemented as a web server.

Application server 330 communicates with network server 325, application servers 340 and 350, and controller 390. Application server 350 may also communicate with other machines and devices (not illustrated in FIG. 3). Application server 330 may host an application or portions of a distributed application. The host application 332 may be in one of many platforms, such as including a Java, PHP, .Net, and Node.JS, be implemented as a Java virtual machine, or include some other host type. Application server 330 may also include one or more agents 334 (i.e. "modules"), including a language agent, machine agent, and network agent, and other software modules. Application server 330 may be implemented as one server or multiple servers as illustrated in FIG. 3.

Application 332 and other software on application server 330 may be instrumented using byte code insertion, or byte code instrumentation (BCI), to modify the object code of the application or other software. The instrumented object code may include code used to detect calls received by application 332, calls sent by application 332, and communicate with agent 334 during execution of the application. BCI may also be used to monitor one or more sockets of the application and/or application server in order to monitor the socket and capture packets coming over the socket.

In some embodiments, server 330 may include applications and/or code other than a virtual machine. For example, servers 330, 340, 350, and 360 may each include Java code, .Net code, PHP code, Ruby code, C code, C++ or other binary code to implement applications and process requests received from a remote source. References to a virtual machine with respect to an application server are intended to be for exemplary purposes only.

Agents 334 on application server 330 may be installed, downloaded, embedded, or otherwise provided on application server 330. For example, agents 334 may be provided in server 330 by instrumentation of object code, downloading the agents to the server, or in some other manner. Agent 334 may be executed to monitor application server 330, monitor code running in a virtual machine 332 (or other program language, such as a PHP, .Net, or C program), machine resources, network layer data, and communicate with byte instrumented code on application server 330 and one or more applications on application server 330.

Each of agents 334, 344, 354 and 364 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 334 may detect operations such as receiving calls and sending requests by application server 330, resource usage, and incoming packets. Agent 334 may receive data, process the data, for example by aggregating data into metrics, and transmit the data and/or metrics to controller 390. Agent 334 may perform other operations related to monitoring applications and application server 330 as discussed herein. For example, agent 334 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 390 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 334 may create a request identifier for a request received by server 330 (for example, a request received by a client 305 or 315 associated with a user or another source). The request identifier may be sent to client 305 or mobile device 315, whichever device sent the request. In embodiments, the request identifier may be created when a data is collected and analyzed for a particular business transaction.

Each of application servers 340, 350 and 360 may include an application and agents. Each application may run on the corresponding application server. Each of applications 342, 352 and 362 on application servers 340-360 may operate similarly to application 332 and perform at least a portion of a distributed business transaction. Agents 344, 354 and 364 may monitor applications 342-362, collect and process data at runtime, and communicate with controller 390. The applications 332, 342, 352 and 362 may communicate with each other as part of performing a distributed transaction. Each application may call any application or method of another virtual machine.

Asynchronous network machine 370 may engage in asynchronous communications with one or more application servers, such as application server 350 and 360. For example, application server 350 may transmit several calls or messages to an asynchronous network machine. Rather than communicate back to application server 350, the asynchronous network machine may process the messages and eventually provide a response, such as a processed message, to application server 360. Because there is no return message from the asynchronous network machine to application server 350, the communications among them are asynchronous.

Data stores 380 and 385 may each be accessed by application servers such as application server 350. Data store 385 may also be accessed by application server 350. Each of data stores 380 and 385 may store data, process data, and return queries received from an application server. Each of data stores 380 and 385 may or may not include an agent.

Controller 390 may control and manage monitoring of business transactions distributed over application servers 330-360. In some embodiments, controller 390 may receive application data, including data associated with monitoring client requests at client 305 and mobile device 315, from data collection server 360. In some embodiments, controller 390 may receive application monitoring data and network data from each of agents 312, 319, 334, 344 and 354. Controller 390 may associate portions of business transaction data, communicate with agents to configure collection of data, and provide performance data and reporting through an interface. The interface may be viewed as a web-based interface viewable by client device 392, which may be a mobile device, client device, or any other platform for viewing an interface provided by controller 390. In some embodiments, a client device 392 may directly communicate with controller 390 to view an interface for monitoring data.

Client device 392 may include any computing device, including a mobile device or a client computer such as a desktop, work station or other computing device. Client computer 392 may communicate with controller 390 to create and view a custom interface. In some embodiments, controller 390 provides an interface for creating and viewing the custom interface as a content page, e.g., a web page, which may be provided to and rendered through a network browser application on client device 392.

Applications 332, 342, 352 and 362 may be any of several types of applications. Examples of applications that may implement applications 332-362 include a Java, PHP, .Net, Node.JS, and other applications.

Figure 4:
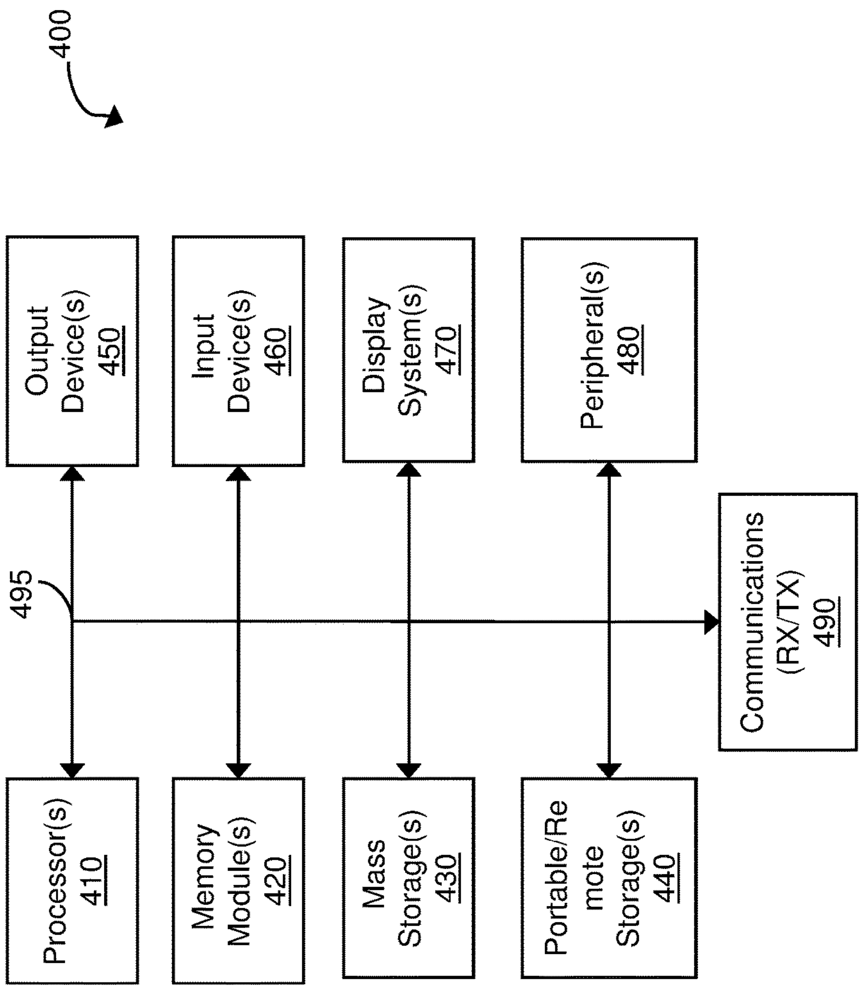
FIG. 4 is a block diagram of an exemplary computing system implementing the disclosed technology.

FIG. 4 is a block diagram of a computer system 400 for implementing the present technology. System 400 of FIG. 4 may be implemented in the contexts of the likes of clients 405, 492, network server 425, servers 430, 440, 450, 460, a synchronous network machine 470 and controller 490.

The computing system 400 of FIG. 4 includes one or more processors 410 and memory 420. Main memory 420 stores, in part, instructions and data for execution by processor 410. Main memory 410 can store the executable code when in operation. The system 400 of FIG. 4 further includes a mass storage device 430, portable storage medium drive(s) 440, output devices 450, user input devices 460, a graphics display 470, and peripheral devices 480.

The components shown in FIG. 4 are depicted as being connected via a single bus 490. However, the components may be connected through one or more data transport means. For example, processor unit 410 and main memory 420 may be connected via a local microprocessor bus, and the mass storage device 430, peripheral device(s) 480, portable or remote storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 420.

Portable storage device 440 operates in conjunction with a portable non-volatile storage medium, such as a compact disk, digital video disk, magnetic disk, flash storage, etc. to input and output data and code to and from the computer system 400 of FIG. 4. The system software for implementing embodiments of the present invention may be stored on such a portable medium and input to the computer system 400 via the portable storage device 440.

Input devices 460 provide a portion of a user interface. Input devices 460 may include an alpha-numeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Examples of suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computer system. For example, peripheral device(s) 480 may include a modem or a router.

The components contained in the computer system 400 of FIG. 4 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 400 of FIG. 4 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for exposing application metrics on the fly, the system including:

a processor;

a memory; and one or more modules stored in the memory and executable by a processor to perform operations including:

initialize a Java managed object for Java Management Extension (JMX);

attach the initialized Java managed object to a repository for Java managed objects accessible by applications;

create a fixed reference to an attributes field in the attached Java managed object;

provide the created fixed reference to the repository after initialization of the Java managed object;

save the fixed reference;

describe a new attribute to be created in a reflection chain expression; and create the new attribute in the Java managed object including:

create an object representing the new attribute based on a processing of the reflection chain expression, place the object representing the new attribute into an attribute map, reference the attribute map using a name associated with the new attribute, inject information from the attribute map into an array of attribute information objects compatible with JMX, update the attributes field of the Java managed object to point to the array of attribute information objects compatible with JMX.

2. The system of claim 1, wherein the Java managed object includes a JMX Managed Bean (MBean).

3. The system of claim 1, wherein one or more modules are configured to access the new attribute using a reflection chain expression.

4. The system of claim 1, wherein one or more modules are configured to modify the new attribute.

5. The system of claim 4, wherein one or more modules are configured to modify the new attribute including:

update the attribute map;

convert the updated attribute map into another array of attribute information objects compatible with JMX; and update the attributes field in the Java managed object to point to the other array of attribute information objects compatible with JMX.

6. The system of claim 1, wherein one or more modules are configured to create the new attribute on the fly without restarting a Java Virtual Machine (JVM).

7. The system of claim 1, wherein one or more modules are configured to modify the new attribute on the fly without restarting a Java Virtual Machine (JVM).

8. The system of claim 1, wherein one or more modules are configured to create and modify the new attribute on the fly using a reflection chain.

9. A method for exposing application metrics on the fly, the method including:

initializing a Java managed object for Java Management Extension (JMX);

attaching the initialized Java managed object to a repository for Java managed objects accessible by applications;

creating a fixed reference to an attributes field in the attached Java managed object;

providing the created fixed reference to the repository after initialization of the Java managed object;

saving the fixed reference;

describing a new attribute to be created in a reflection chain expression; and creating the new attribute in the Java managed object including:

creating an object representing the new attribute based on a processing of the reflection chain expression, placing the object representing the new attribute into an attribute map, referencing the attribute map using a name associated with the new attribute, injecting information from the attribute map into an array of attribute information objects compatible with JMX, updating the attributes field of the Java managed object to point to the array of attribute information objects compatible with JMX.

10. The method of claim 9, wherein the Java managed object includes a JMX Managed Bean (MBean).

11. The method of claim 9, including accessing the new attribute using a reflection chain expression.

12. The method of claim 9, including modifying the new attribute.

13. The method of claim 12, wherein the modifying the new attribute include:

updating the attribute map;

converting the updated attribute map into another array of attribute information objects compatible with JMX; and updating the attributes field in the Java managed object to point to the other array of attribute information objects compatible with JMX.

14. The method of claim 9, wherein creating the new attribute on the fly is performed without restarting a Java Virtual Machine (JVM).

15. The method of claim 9, wherein modifying the new attribute on the fly is performed without restarting a Java Virtual Machine (JVM).

16. The method of claim 9, wherein creating and modifying the new attribute on the fly include using a reflection chain.

17. A non-transitory computer readable medium embodying instructions when executed by a processor to cause operations to be performed for exposing application metrics on the fly, the operations including:

initializing a Java managed object for Java Management Extension (JMX);

attaching the initialized Java managed object to a repository for Java managed objects accessible by applications;

creating a fixed reference to an attributes field in the attached Java managed object;

providing the created fixed reference to the repository after initialization of the Java managed object;

saving the fixed reference;

describing a new attribute to be created in a reflection chain expression; and creating the new attribute in the Java managed object including:

creating an object representing the new attribute based on a processing of the reflection chain expression, placing the object representing the new attribute into an attribute map, referencing the attribute map using a name associated with the new attribute, injecting information from the attribute map into an array of attribute information objects compatible with JMX, updating the attributes field of the Java managed object to point to the array of attribute information objects compatible with JMX.

18. The non-transitory computer readable medium of claim 17, wherein the Java managed object includes a JMX Managed Bean (MBean).

19. The non-transitory computer readable medium of claim 17, wherein the instructions are executable to access the new attribute using a reflection chain expression.

20. The non-transitory computer readable medium of claim 17, wherein the instructions are accessible to modify the new attribute.

* * * * *